Figure 1:
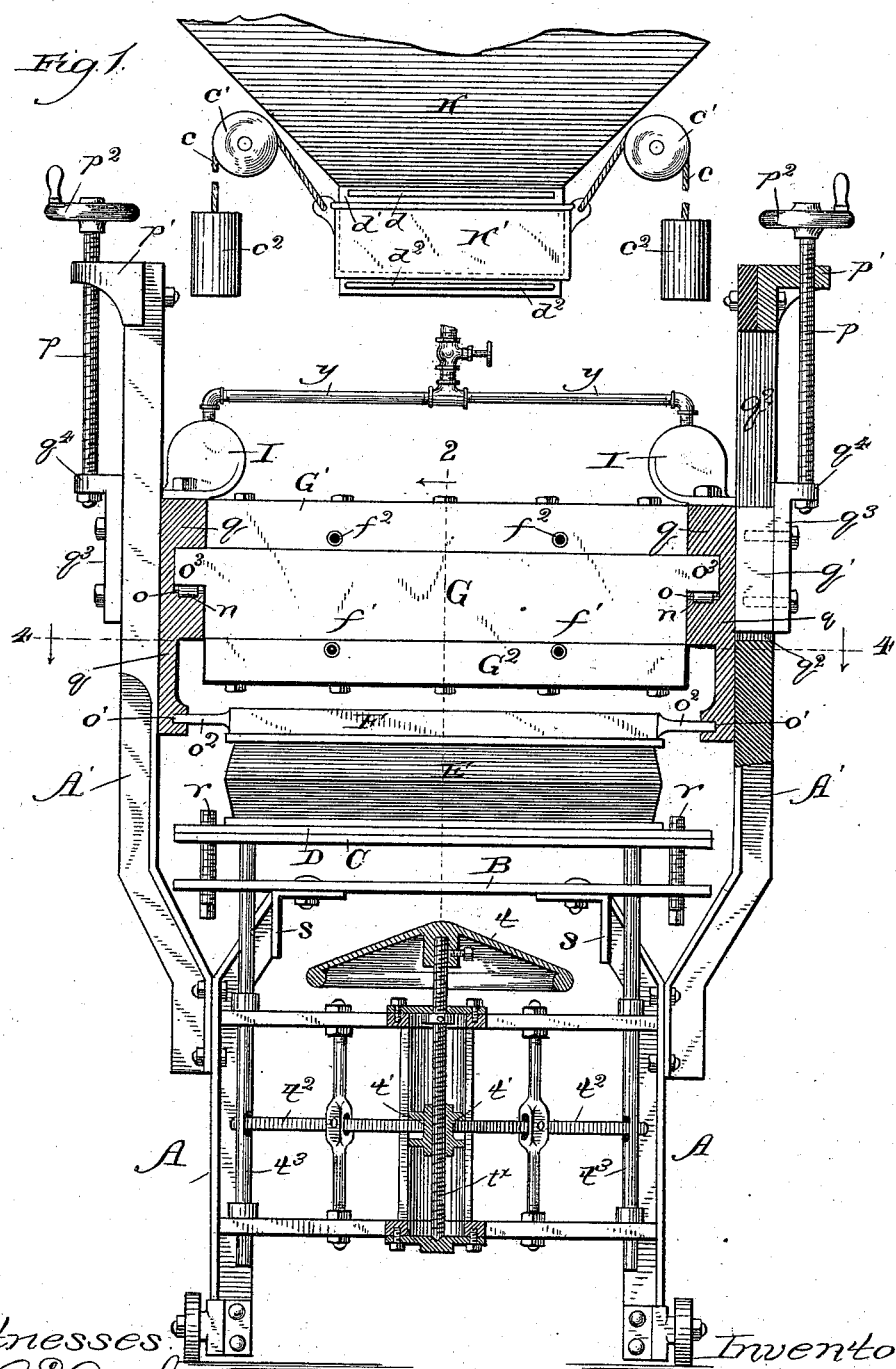

(No Model.) 5 Sheets—Sheet 1.

J. R. DAVIES.
SAND MOLDING MACHINE.

No. 382,217. Patented May 1, 1888.

Witnesses:
Chas. E. Gaylord.
Chas. E. Gorton.

Inventor:
John R. Davies,
By Dyrenforth & Dyrenforth
Att'ys.

(No Model.) 5 Sheets—Sheet 2.
J. R. DAVIES.
SAND MOLDING MACHINE.
No. 382,217. Patented May 1, 1888.
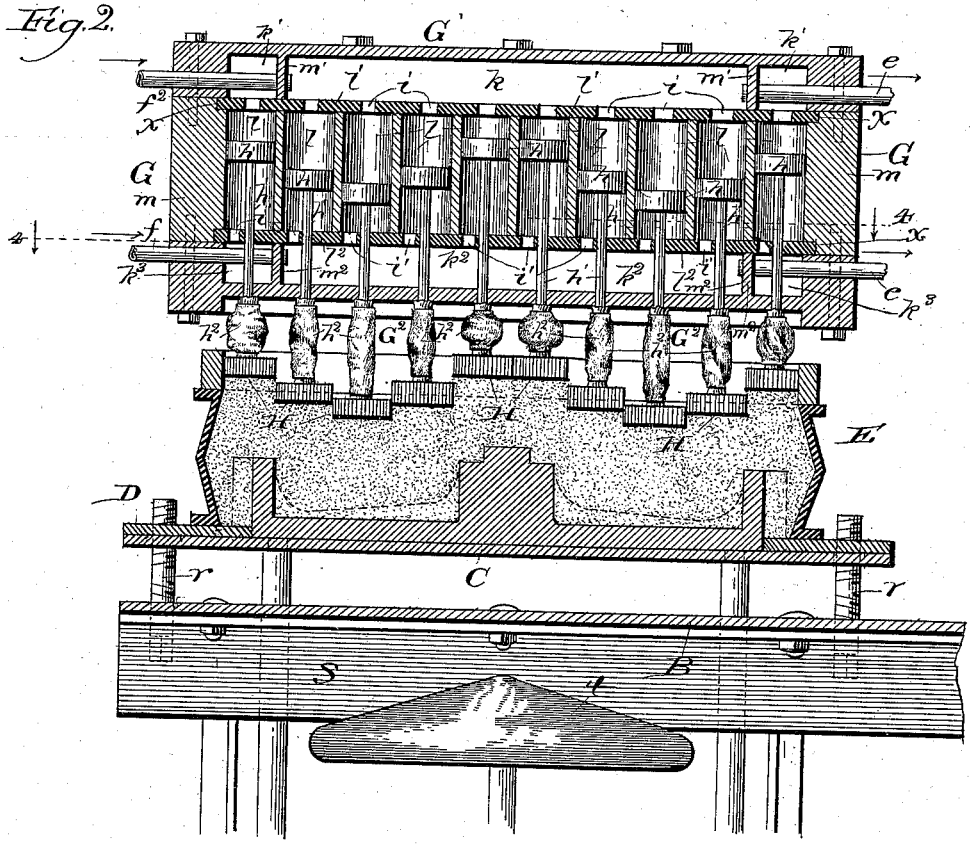
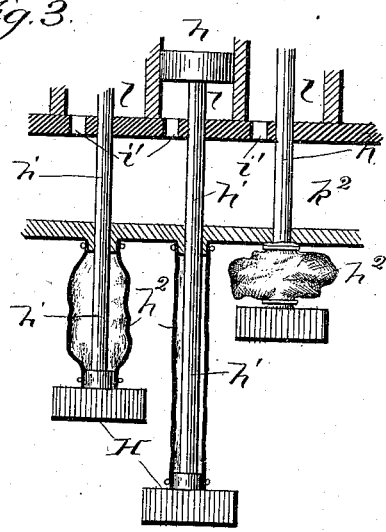
Witnesses:
Chas. E. Gaylord.
Chas. E. Gorton.
Inventor:
John R. Davies
By Dyrenforth & Dyrenforth
Attys.

(No Model.) 5 Sheets—Sheet 3.
J. R. DAVIES.
SAND MOLDING MACHINE.
No. 382,217. Patented May 1, 1888.
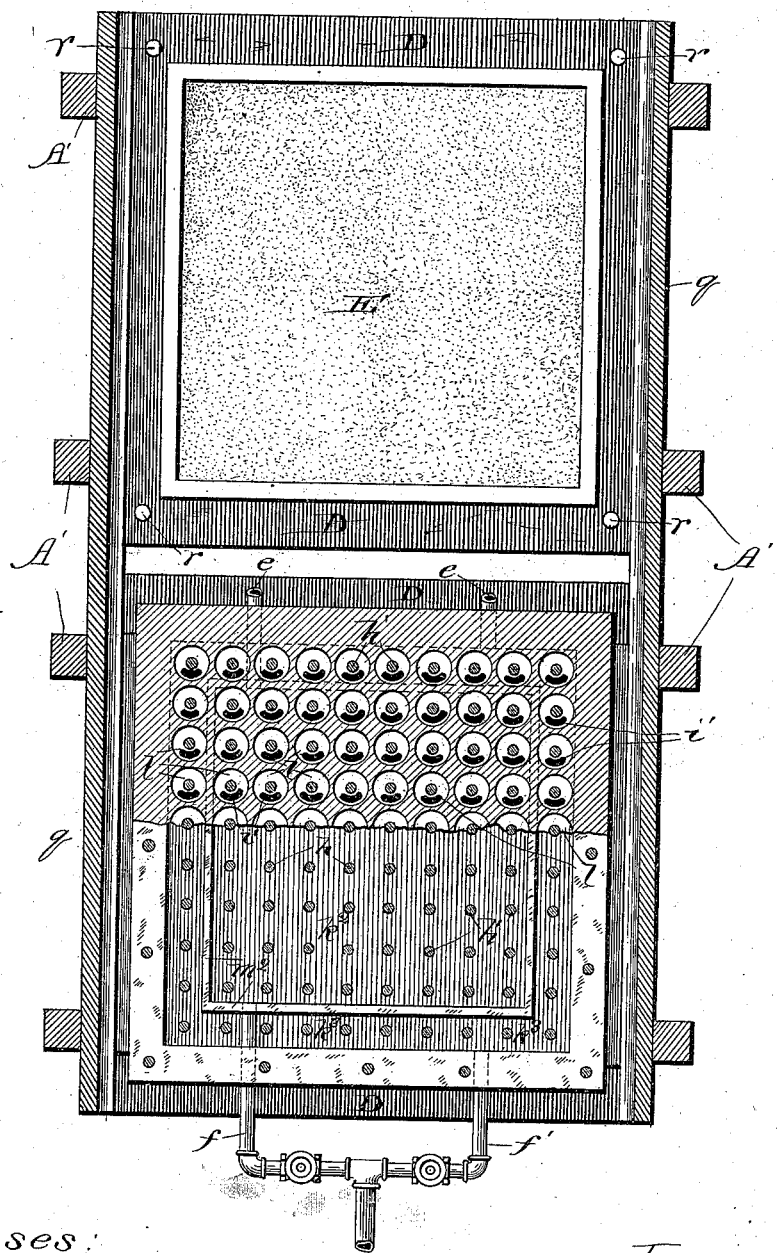

(No Model.)
5 Sheets—Sheet 4.
J. R. DAVIES.
SAND MOLDING MACHINE.
No. 382,217. Patented May 1, 1888.
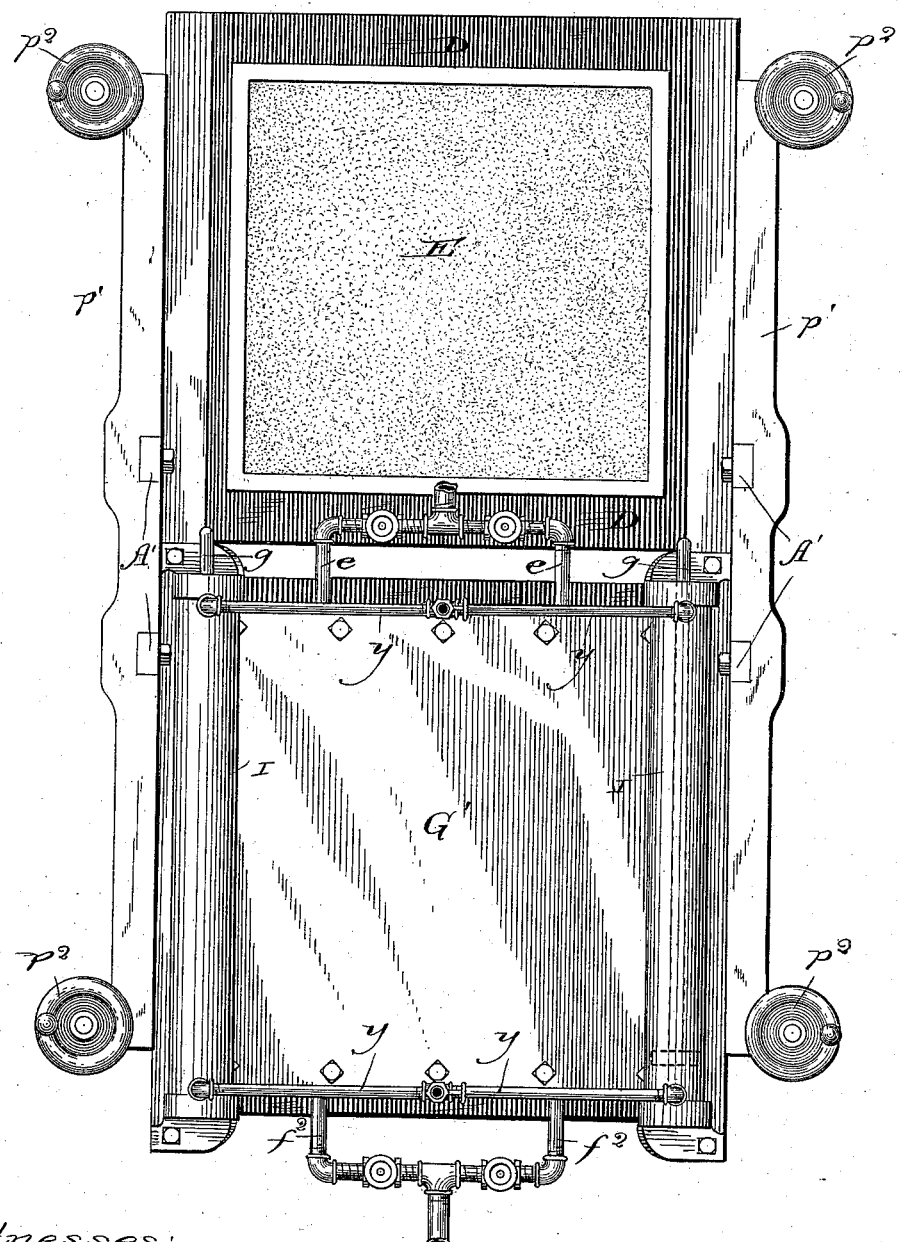
Witnesses:
Chas. E. Gaylord.
Chas. E. Gorton.
Inventor:
John R. Davies,
By Dyrenforth & Dyrenforth
Att'ys (No Model.)
J. R. DAVIES.
SAND MOLDING MACHINE.
No. 382,217. Patented May 1, 1888.
5 Sheets—Sheet 5.
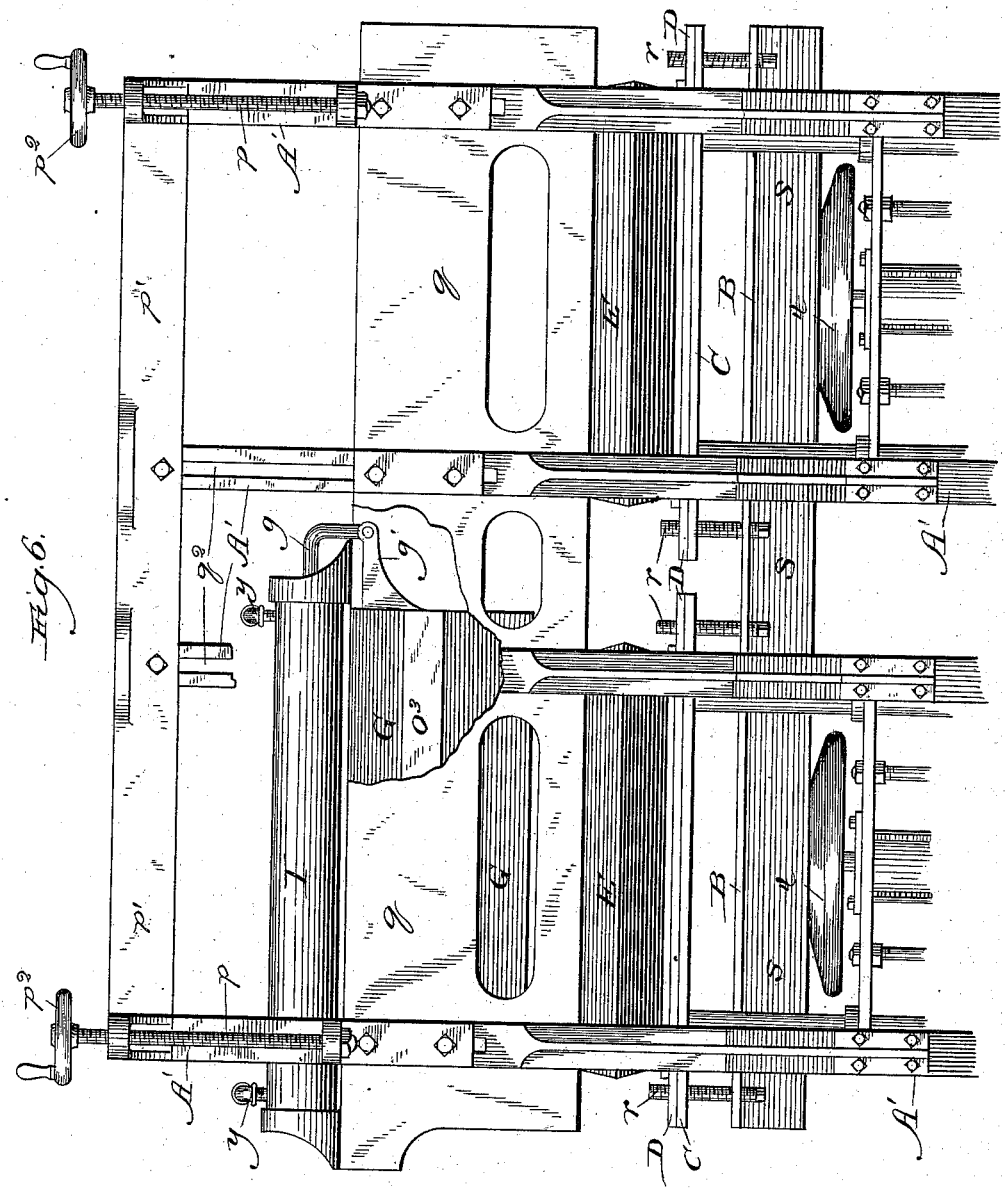

UNITED STATES PATENT OFFICE.

JOHN R. DAVIES, OF PULLMAN, ILLINOIS.

SAND-MOLDING MACHINE.

SPECIFICATION forming part of Letters Patent No. 382,217, dated May 1, 1888.

Application filed October 4, 1887. Serial No. 251,408. (No model.)

*To all whom it may concern:*

Be it known that I, JOHN R. DAVIES, a citizen of the United States, residing at Pullman, in the county of Cook and State of Illinois, have invented a new and useful Improvement in Sand-Molding Machines, of which the following is a specification.

My invention relates to an improvement in the class of machines in which a mold is formed by tamping by means of some power other than by hand the material known in the art of molding as "sand" in a flask upon a pattern. A machine of the class mentioned is shown and described in Letters Patent of the United States No. 365,584, granted me on the 28th day of June, 1887.

My present improvement is designed especially for use in connection with the flask and frame portion of my aforesaid formerly-patented machine, though it is not necessarily, and I do not wish to be understood as considering that its use is confined to such connection.

My object is to provide a machine which shall serve to pack the sand in the flask by the employment of means analogous to that of tamping by hand, but by far more effective and reliable in producing the mold.

My invention consists in the general construction of my improved machine; and it further consists in details of construction and combinations of parts.

In the drawings, Figure 1 is a partly broken sectional end elevation of my improved machine, showing my improved hopper in position above it; Fig. 2, a section taken on the line 2 of Fig. 1 and viewed in the direction of the arrow; Fig. 3, an enlarged broken portion of the device as shown in Fig. 2; Fig. 4, a sectional plan view taken on the lines 4 4 of Figs. 1 and 2 and viewed in the direction of the arrows; Fig. 5, a plan view of the entire device, showing the arrangement of the pressure-conducting pipes and having a part broken away to display a detail; and Fig. 6, a broken side elevation.

A is the frame-work of the device, carrying mechanism in the form of a hand wheel, $t$, operating by means of a nut, $t'$, upon its screw-threaded shaft through levers $t^2$ and lifters $t^3$. The parts thus referred to and their operation are fully described in Letters Patent of the United States No. 300,853, granted me on the 24th day of June, 1884.

$A'$ are vertical extensions of the frame A.

B is a square horizontal frame supported on the main frame A by brackets $s$, to which the part B is rigidly secured, as shown. Screws $r$ extend vertically upward from the four corners of the frame B through corresponding corners of a pattern-plate, C, and slot or silhouette plate D above the pattern-plate, and the screws serve to adjust the slot-plate to the so-called "parting-line" of the pattern.

E is the flask, preferably of the form shown, which is that of a double taper, since thereby it best holds the sand.

The vertical extensions $A'$ of the frame A are provided with slots $q^2$ toward their upper ends to receive tongues $q'$ of horizontal bolsters $q$, and to which, on the outer side of the frame, are bolted bars $q^3$, having laterally-extending heads $q^4$ to afford bearings for the lower ends of screw-posts $p$, extending toward their upper ends through guide-bearings $p'$ on the upper part, $A'$, of the main frame, and provided with hand-wheels $p^2$. The slots $q^2$ afford guides for the vertical adjustment of the bolsters, which extend through the machine from end to end, and are raised and lowered with reference to the depth or shallowness of the flask employed by means of the screws $p$, operated from the hand-wheels $p^2$.

For a purpose hereinafter stated the frame A A' and parts described as supported by it are duplicated, the bolsters $q$ extending throughout both frames. On their inner sides the bolsters $q$ are provided with longitudinal recesses $o$, having friction-rollers $n$, and longitudinal recesses $o'$ below the recesses $o$.

F is a sand-frame having tongues $o^2$ extending from opposite sides into the recesses $o'$ of the bolsters wherein the frame is supported to permit its movement back and forth on the tongues. The sand-frame serves the usual purpose of affording an extension of the flask to enable it to contain all the sand necessary for the formation of the mold before being compacted, in which state, of course, it is more bulky than after being tamped down, and it serves, besides, owing to its sliding function, another purpose, hereinafter described.

G is a box, by preference corresponding in outline with the opening to the flask E. I prefer to form the box G in the manner of construction most clearly represented in Fig. 2—namely, of a solid block of metal, $m$, bored to produce a desired number of vertical chambers or cylinders, $l$, and recessed on its inner, upper, and lower edges, as shown at $x$, to afford seats for plates $l'$ and $l^2$, which respectively cover the upper and lower ends of the cylinders. A cap, G', is bolted to the upper side of the part $m$ and is provided with a wall, $m'$, which coincides with the wall separating the outermost series of cylinders $l$ from the inner ones and affords a chamber, $k$, above the inner and a chamber, $k'$, above the outer cylinders. A similar cap, $G^2$, is bolted to the lower side of the part $m$ and has a wall, $m^2$, which coincides with the wall which separates the outermost series of cylinders $l$ from the inner ones and affords the chambers $k^2$ and $k^3$. Openings $i$ and $i'$ lead into the cylinders $l$, respectively, through the heads or plates $l'$ and $l^2$. Each cylinder $l$ contains a piston-head, $h$, from which a piston-rod, $h'$, extends through the plate $l^2$, forming the head of the cylinder, and through the cap $G^2$, and carries at its lower end a tamping-head, H, and between the tamping-head and cap $G^2$ each rod is surrounded by a flexible material, $h^2$—such as rubber—secured to the head $G^2$ and serving to protect the rods from the access to them of sand.

Tongues $o^3$ extend from the opposite sides of the box G into the recesses $o$ on the bolsters $q$, and thus support the box on the friction-rollers $n$ and permit it to be slid back and forth, in the manner hereinafter described.

On corresponding ends of each bolster $q$ is a cylinder, I, containing a piston and rod, $g$, the latter being connected at its end, which extends beyond the cylinder and is bent, as shown in Fig. 6, with a bracket, $g'$, secured to the tongue $o^3$ of the box below it, and the cylinders I are connected by piping $y$, controlled by suitable valve mechanism to conduct pressure (steam, air, or hydraulic) simultaneously to or from corresponding sides of the pistons. Pipes $f$ and $f'$, Fig. 4, lead, respectively, into the chambers $k^2 k^3$ in the lower part of the box, and similar pipes (one of which is indicated in Fig. 2 as $f^2$) lead, respectively, into the chambers $k k'$ at the upper end of the box. Exhaust-pipes $e$ lead, respectively, from the chambers $k$, $k'$, $k^2$, and $k^3$. The pipes thus referred to are not described in detail, as they present no novel features, being designed to introduce and exhaust the pressure which enters the chambers above and below the pistons $h$. They are controlled by suitable valves in the usual manner, which permit the pressure to be introduced into chambers $k$ and $k'$ or $k^2$ and $k^3$ separately or simultaneously, and of course permit the exhaust to be produced correspondingly. The connections of the various pipes with the pressure-supply must be flexible in order to permit sliding of the box, as hereinafter described.

My device is intended to be operated by steam-pressure, though other fluid-pressure may be used.

My improved machine is operated as follows: With the sand-frame F in position over a flask, E, and the box G moved out of the way, sand is let into the flask from a hopper, K, which is of novel construction and forms an important auxiliary feature of my invention. It is supported in rigid position any desired distance above the machine in line with the flask, and is provided in the upper portion of its spout $d'$ with a slide-valve, $d$. A cap, K', surrounds the spout $d'$, and is also provided near its lower end, which is open, with a slide-valve, $d^2$, or other form of valve, and it is supported by ropes or the like, $c$, passing over pulleys $c'$, and secured to the cap at opposite sides, and carrying weights $c^2$, which more than counterbalance the cap when empty. The hopper is supplied from a suitable elevator, and while being supplied the slide-valve $d$ is closed. Withdrawal of the latter admits the contents of the hopper into the cap K', (which is preferably of a size to contain a quantity sufficient to fill the flask,) and the weight of the sand thus admitted to the cap lowers it toward the flask. When the cap is filled, the valve $d$ is closed, either against the escape of a remainder of the contents of the hopper, if of a capacity greater than the cap, or to cause it to hold a new supply. When the cap reaches a position of desired proximity to the flask, the valve $d^2$ is opened, allowing the contents of the cap to discharge into the flask. After the discharge of its contents, the cap is automatically raised by the weights $c^2$ into its position around the spout $d'$. Steam is then introduced into the cylinders I upon the proper sides of the pistons therein to force the latter, and with them the box G, through its connection with the piston-rods $g$, hereinbefore described, in the direction to slide the box into position over the flask, when steam is admitted into the chamber $k'$, whence it enters the cylinders $l$ below it and forces the pistons therein down, and with them the tamping-heads, upon the sand in the flask around the edges of the latter, with the resultant effect of "peening" or packing the sand around the edges of the flask to form, so to speak, a firm foundation for the mold. The tamping-heads are then raised by admitting steam into the chamber $k^3$ and exhausting that previously introduced into the chamber $k'$. After smoothing or leveling the sand in the mold, (which is done by hand,) steam is admitted to both chambers $k$ and $k'$ to force down all the pistons $h$ and tamping-heads H, which produces tamping of the entire contents of the flask, and thus completes the mold. All the tamping-heads are then raised by admitting steam into the chambers $k^2$ and $k^3$ and exhausting that previously introduced into the chambers $k$ and $k'$. The two tamping operations of the heads H, as thus described, (which heads, as will be seen, are sufficiently close together to cover substantially the entire surface of the flask,) are ordinarily sufficient to form the mold, though, of course, they may be actuated as often as required. Although I greatly prefer to use fluid-pressure to raise the pistons and tamping-heads as well as to lower them, it is quite obvious that the lowering may be effected against the resistance of spring mechanism, the resilience of which will serve to effect the raising upon relieving the pressure from above. It is also to be observed that while the tamping-heads are shown and described to be provided in two independently-operative series only, they could readily be made independently operative in any desired number of series by increasing the number of walls $m'$ and $m^2$ and providing suitable connections with the pressure supply and exhaust.

On finishing the mold and preparatory to its removal the sand-frame F is slid back, thereby scraping from the flask all sand extending above its edge, and adjusted over the other duplicate flask, E, of the machine, prepared, like that described, to be operated on by the tamping-heads during the tamping operation just described. The box G, with its contents, is then also slid into position over such duplicate flask by admitting steam into the cylinders I on the proper sides of the pistons therein. Thus it will be seen that by providing the flask and parts immediately connected with it in duplicate on the one or substantially the one frame the machine is enabled to perform double work, since one mold can be undergoing the process of completion while the other is undergoing the preparatory stage, and the one tamping device may be used alternately for each, and may be thus in continuous operation.

The rammer-heads are preferably, but not necessarily, of uniform size, and they produce uniform compacting of the sand—a matter which is practically impossible in tamping by hand—the differences in the distance of descent of the rammers, as shown in Fig. 2, corresponding with the depressions and elevations in the pattern.

What I claim as new, and desire to secure by Letters Patent, is—

1. In a sand-molding machine, the combination, with the frame, of a box having cylinders containing pistons, tamping-heads connected with the pistons, means for actuating the tamping-heads by fluid-pressure, and a wall within the box separating the cylinders into an inner and an outer non-intercommunicating series, whereby the tamping-heads of the outer series of cylinders may be actuated independently of those in the inner series to peen the sand around the edges in the flask, substantially as and for the purpose set forth.

2. In a sand-molding machine, the combination, with the frame, of a horizontally-sliding box, G, having cylinders $l$, containing pistons $h$, tamping-heads H, connected with the pistons, and means for actuating the tamping-heads by fluid-pressure to tamp the sand, substantially as described.

3. In a sand-molding machine, the combination, with the frame, of a horizontally-sliding box, G, containing cylinders $l$, non-intercommunicating chambers $k$ and $k'$, communicating, respectively, with the cylinders below them, and non-intercommunicating chambers $k^2$ and $k^3$, communicating, respectively, with the cylinders above them, pistons $h$ in the said cylinders, tamping-heads H, connected with the said pistons, and fluid-pressure and exhaust pipes leading, respectively, to and from the said chambers, substantially as and for the purpose set forth.

4. In a sand-molding machine, the combination, with the frame, of a horizontally-sliding box, G, containing cylinders $l$, non-intercommunicating chambers $k$ and $k'$, communicating, respectively, with the cylinders below them, and non-intercommunicating chambers $k^2$ and $k^3$, communicating, respectively, with the cylinders above them, fluid-pressure cylinders I, having their pistons connected with the box, and fluid-pressure and exhaust pipes leading, respectively, to and from the said chambers, substantially as and for the purpose set forth.

5. In a sand-molding machine, the combination of a frame carrying two flasks, E, a box supported to slide horizontally in the frame above the flasks, rammers carried by the said box, and means for actuating the rammers by fluid-pressure to tamp the sand in the flask below the said box, substantially as described.

6. In a sand-molding machine, the combination, with the frame, of a vertically-adjustable horizontally-sliding box, G, having cylinders $l$, containing pistons $h$, tamping-heads H, connected with the pistons, and means for actuating the tamping-heads by fluid-pressure to tamp the sand, substantially as described.

7. In a sand-molding machine, the combination, with the frame, of a vertically-adjustable horizontally-sliding box, G, containing cylinders $l$, non-intercommunicating chambers $k$ and $k'$, communicating, respectively, with the cylinders below them, and non-intercommunicating chambers $k^2$ and $k^3$, communicating, respectively, with the cylinders above them, pistons $h$ in the said cylinders, tamping-heads H, connected with the said pistons, and fluid-pressure and exhaust pipes leading, respectively, to and from the said chambers, substantially as and for the purpose set forth.

8. In a sand-molding machine, the combination, with the frame, of a vertically-adjustable sliding box, G, containing cylinders $l$, non-intercommunicating chambers $k$ and $k'$, communicating, respectively, with the cylinders below them, and non-intercommunicating chambers $k^2$ and $k^3$, communicating, respectively, with the cylinders above them, fluid-pressure cylinders I, having their pistons connected with the box, and fluid-pressure and exhaust pipes leading, respectively, to and from the said chambers, substantially as and for the purpose set forth.

9. In a sand-molding machine, the combination, with the frame, of a vertically-adjustable sliding box, G, containing cylinders $l$, non-intercommunicating chambers $k$ and $k'$, communicating, respectively, with the cylinders below them, and non-intercommunicating chambers $k^2$ and $k^3$, communicating, respectively, with the cylinders above them, pistons $h$ in the said cylinders having rods $h'$ extending through the base of the box and carrying tamping-heads H, and flexible material, $h^2$, surrounding the rods between the tamping-heads and base of the box and secured to the said base, substantially as and for the purpose set forth.

10. In combination with a sand-molding machine, a hopper supported above the flask and having a slide-valve, $d$, in its spout, and a cap, K', supported by weighted cables $c$ on pulleys to normally surround the spout, and having a valve, $d^2$, substantially as described.

JOHN R. DAVIES.

In presence of—
J. W. DYRENFORTH,
CHAS. E. GAYLORD.